United States Patent
Hull et al.

(10) Patent No.: US 10,846,644 B2
(45) Date of Patent: Nov. 24, 2020

(54) COGNITIVE PROCESS LEARNING

(71) Applicant: International Business Machines Corporation, Armonk, NY (US)

(72) Inventors: Richard B. Hull, Chatham, NJ (US); Hamid R. Motahari Nezhad, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 15/706,142

(22) Filed: Sep. 15, 2017

(65) Prior Publication Data

US 2019/0087755 A1   Mar. 21, 2019

(51) Int. Cl.
*G06Q 10/06* (2012.01)
*G06N 5/02* (2006.01)
*G06F 16/93* (2019.01)
*G06F 16/901* (2019.01)

(52) U.S. Cl.
CPC ....... *G06Q 10/067* (2013.01); *G06F 16/9024* (2019.01); *G06F 16/93* (2019.01); *G06N 5/025* (2013.01); *G06Q 10/0633* (2013.01)

(58) Field of Classification Search
CPC .......................................... G06Q 10/00–50/00
USPC ............................................... 705/7.11–7.42
See application file for complete search history.

(56) References Cited

U.S. PATENT DOCUMENTS

| | | | | |
|---|---|---|---|---|
| 5,321,812 A * | 6/1994 | Benedict | ................. | H04L 41/12 370/216 |
| 5,960,420 A * | 9/1999 | Leymann | ............... | G06Q 10/10 |
| 6,038,538 A * | 3/2000 | Agrawal | .............. | G06Q 10/063 705/7.11 |
| 6,041,306 A * | 3/2000 | Du | ........................ | G06F 9/4843 705/7.26 |
| 6,279,009 B1 * | 8/2001 | Smirnov | ................. | G06Q 10/06 |
| 6,892,192 B1 * | 5/2005 | Geddes | .................. | G06Q 10/06 706/14 |
| 6,963,875 B2 * | 11/2005 | Moore | ..................... | G06F 16/00 |
| 6,985,900 B2 * | 1/2006 | Codd | ........................ | G06F 9/44 706/45 |

(Continued)

FOREIGN PATENT DOCUMENTS

WO   2016153464 A1   9/2016

OTHER PUBLICATIONS

Markovic, Ivan, and Marek Kowalkiewicz. "Linking business goals to process models in semantic business process modeling." 2008 12th International IEEE Enterprise Distributed Object Computing Conference. IEEE, 2008. (Year: 2008).*

(Continued)

*Primary Examiner* — Alan S Miller

(74) *Attorney, Agent, or Firm* — Sherman IP LLP; Kenneth L. Sherman; Steven Laut

(57) ABSTRACT

One embodiment provides discovering knowledge rich and executable business process models from unstructured information including obtaining, by a processor, unstructured data source information describing business processes. Based on the unstructured data source information, an executable specification of described business processes and a corresponding amendable textual specification are generated. Business process models are generated using a process knowledge graph based on the executable specification.

20 Claims, 10 Drawing Sheets

(56) References Cited

U.S. PATENT DOCUMENTS

| | | | |
|---|---|---|---|
| 7,069,179 B2* | 6/2006 | Kim | G06Q 10/06 702/182 |
| 7,493,593 B2* | 2/2009 | Koehler | G06Q 10/10 717/106 |
| 7,599,901 B2* | 10/2009 | Mital | G06N 5/025 706/46 |
| 7,600,007 B1* | 10/2009 | Lewis | G06Q 10/04 709/223 |
| 7,634,467 B2 | 12/2009 | Ryan et al. | |
| 7,904,302 B2* | 3/2011 | Adendorff | G06Q 10/10 705/1.1 |
| 7,925,659 B2* | 4/2011 | Wefers | G06Q 10/06 707/756 |
| 8,020,104 B2* | 9/2011 | Robarts | G06F 1/163 715/744 |
| 8,073,865 B2 | 12/2011 | Davis | |
| 8,091,071 B2 | 1/2012 | Tsantilis et al. | |
| 8,099,376 B2 | 1/2012 | Serrano-Morales et al. | |
| 8,265,979 B2* | 9/2012 | Golani | G06Q 10/06316 705/7.27 |
| 8,266,148 B2* | 9/2012 | Guha | G06F 16/9535 707/737 |
| 8,352,414 B2* | 1/2013 | Bhamidipaty | G06Q 10/063 707/601 |
| 8,386,996 B2* | 2/2013 | Prigge | G06Q 10/10 705/7.12 |
| 8,396,815 B2* | 3/2013 | Drory | G06Q 10/10 706/11 |
| 8,447,859 B2* | 5/2013 | Bobak | G06F 9/5061 709/226 |
| 8,606,622 B2* | 12/2013 | Chang | G06Q 10/06 705/7.38 |
| 8,676,818 B2* | 3/2014 | Curbera | G06F 16/9024 707/755 |
| 8,949,773 B2* | 2/2015 | Paradkar | G06F 8/34 705/7.13 |
| 9,251,489 B2* | 2/2016 | Chan | G06Q 10/067 |
| 9,348,560 B2 | 5/2016 | Xie et al. | |
| 9,384,322 B2 | 7/2016 | Sasidhar | |
| 9,503,464 B2 | 11/2016 | Zahran | |
| 9,542,388 B2 | 1/2017 | Carrier et al. | |
| 9,953,081 B2* | 4/2018 | Gomadam | G06F 16/22 |
| 2001/0032092 A1* | 10/2001 | Calver | G06Q 30/02 705/1.1 |
| 2001/0049615 A1* | 12/2001 | Wong | G06Q 10/10 705/7.14 |
| 2002/0116362 A1* | 8/2002 | Li | G06F 16/2474 |
| 2002/0194042 A1* | 12/2002 | Sands | G06Q 10/06393 705/7.39 |
| 2003/0187743 A1* | 10/2003 | Kumaran | G06Q 40/04 705/26.1 |
| 2004/0162741 A1 | 8/2004 | Flaxer et al. | |
| 2004/0260590 A1* | 12/2004 | Golani | G06Q 10/0633 705/7.26 |
| 2006/0080159 A1* | 4/2006 | Kumar | G06Q 10/0635 705/7.28 |
| 2006/0085205 A1 | 4/2006 | Kumar | |
| 2006/0111921 A1* | 5/2006 | Chang | G06Q 10/06375 705/301 |
| 2007/0150330 A1 | 2/2007 | McGoveran | |
| 2007/0174710 A1* | 7/2007 | Duan | G06F 11/0727 714/38.14 |
| 2008/0086499 A1* | 4/2008 | Wefers | G06Q 10/10 |
| 2008/0183744 A1* | 7/2008 | Adendorff | G06Q 10/10 |
| 2009/0112667 A1* | 4/2009 | Blackwell | G06Q 10/063 705/7.27 |
| 2009/0157812 A1* | 6/2009 | Bavly | G06F 16/25 709/204 |
| 2009/0172689 A1* | 7/2009 | Bobak | G06F 11/1479 718/104 |
| 2009/0177634 A1* | 7/2009 | Behrendt | G06F 16/00 |
| 2009/0228309 A1* | 9/2009 | Moll | G06Q 10/06 705/7.12 |
| 2009/0228428 A1 | 9/2009 | Dan et al. | |
| 2010/0114629 A1* | 5/2010 | Adler | G06Q 10/00 705/7.36 |
| 2010/0325206 A1* | 12/2010 | Dayal | G06Q 10/10 709/204 |
| 2011/0270639 A1* | 11/2011 | Blackwell | G06Q 10/063 705/7.11 |
| 2011/0270794 A1* | 11/2011 | Drory | G06N 7/02 706/52 |
| 2011/0320491 A1 | 12/2011 | Jung et al. | |
| 2012/0166254 A1* | 6/2012 | Chang | G06Q 10/06 705/7.36 |
| 2012/0197631 A1* | 8/2012 | Ramani | G06F 40/268 704/9 |
| 2013/0085799 A1* | 4/2013 | Zhang | G06Q 10/00 705/7.26 |
| 2013/0124450 A1* | 5/2013 | Drory | G06Q 10/10 706/52 |
| 2014/0129294 A1 | 5/2014 | Rosenberg et al. | |
| 2014/0351261 A1* | 11/2014 | Aswani | G06F 16/9024 707/741 |
| 2015/0095094 A1* | 4/2015 | Chan | G06Q 10/06316 705/7.26 |
| 2015/0095303 A1 | 4/2015 | Sonmez et al. | |
| 2015/0142718 A1 | 5/2015 | Bostick et al. | |
| 2015/0235154 A1 | 8/2015 | Utschig | |
| 2016/0071031 A1* | 3/2016 | Daley | G06F 3/04842 705/348 |
| 2016/0080422 A1* | 3/2016 | Belgodere | G06N 5/048 706/47 |
| 2016/0085852 A1 | 3/2016 | Deshpande et al. | |
| 2016/0147514 A1 | 5/2016 | Baskaran et al. | |
| 2016/0328371 A1* | 11/2016 | Logan | G06F 40/20 |
| 2016/0373456 A1* | 12/2016 | Vermeulen | G06F 16/245 |
| 2017/0004203 A1 | 1/2017 | Pandit et al. | |
| 2017/0091664 A1* | 3/2017 | Sanchez | G06F 16/2465 |
| 2017/0185674 A1 | 6/2017 | Tonkin et al. | |
| 2017/0243118 A1* | 8/2017 | Nassar | G06F 16/9024 |
| 2017/0277680 A1* | 9/2017 | Ajmera | G06F 16/955 |
| 2018/0053327 A1* | 2/2018 | Contractor | G06F 16/35 |
| 2018/0114121 A1* | 4/2018 | Rana | G06N 5/04 |
| 2018/0129959 A1* | 5/2018 | Gustafson | G06N 20/00 |
| 2018/0203833 A1 | 7/2018 | Liang et al. | |
| 2020/0160239 A1 | 5/2020 | Hull et al. | |

OTHER PUBLICATIONS

Bhattacharya, Kamal, et al. "Towards formal analysis of artifact-centric business process models." International Conference on Business Process Management. Springer, Berlin, Heidelberg, 2007. (Year: 2007).*

Gruhn, V. et al., "Reducing the Cognitive Complexity of Business Process Models," 8th IEEE International Conference on Cognitive Informatics, Sep. 2009, pp. 339-345, IEEE, United States.

Simoes, D., et al., "Modelling Sensible Business Processes," FDSE 2015 Proceedings of the Second International Conference on Future Data and Security Engineering, Nov. 2015, pp. 165-182, vol. 9446, Springer, Vietnam.

Hull, R., et al., "Rethinking BPM in a Cognitive World: Transforming How We Learn and Perform Business Processes," 14th International Conference BPM 2016, Sep. 18-22, 2016, pp. 1-16, Springer, Rio de Janeiro, Brazil.

Mell, P., et al., "The NIST Definition of Cloud Computing", National Institute of Standards and Technology Special Publication 800-145, Sep. 2011, pp. 1-7, U.S. Department of Commerce, United States.

Wang, M., et al., "From Process Logic to Business Logic—A Cognitive Approach to Business Process Management," Information & Management, 2006, pp. 179-193, V. 43, No. 2, Elsevier, Netherlands.

(56) References Cited

OTHER PUBLICATIONS

Huang, Z., et al., "Reinforcement Learning Based Resource Allocation in Business Process Management," Data & Knowledge Engineering, 2011, pp. 127-145, vol. 70, No. 1, Elsevier, Netherlands.
List of IBM Patents or Applications Treated as Related.

* cited by examiner

COGNITIVE PROCESS LEARNING

BACKGROUND

There are many business processes that are described in unstructured information sources, and manually executed. Handling and managing work (processes) conventionally involves interaction among employees, systems and devices. Interactions occur over email, chat, and messaging apps. Descriptions exist for processes, procedures, policies, laws, rules, regulations, plans, external entities (such as customers, partners and government agencies), surrounding world, news, social networks, etc. Coordinating this information, and discovering the underlying business processing procedures and mapping them into formats that can be automatically reasoned about and/or transformed into executable code is a challenge.

SUMMARY

Embodiments relate to discovering knowledge rich and executable business process models from unstructured information. One embodiment provides for discovering knowledge rich and executable business process models from unstructured information including obtaining, by a processor, unstructured data source information describing business processes. Based on the unstructured data source information, an executable specification of described business processes and a corresponding amendable textual specification are generated. Business process models are generated using a process knowledge graph based on the executable specification.

These and other features, aspects and advantages of the present invention will become understood with reference to the following description, appended claims and accompanying figures.

DETAILED DESCRIPTION

Figure 1:
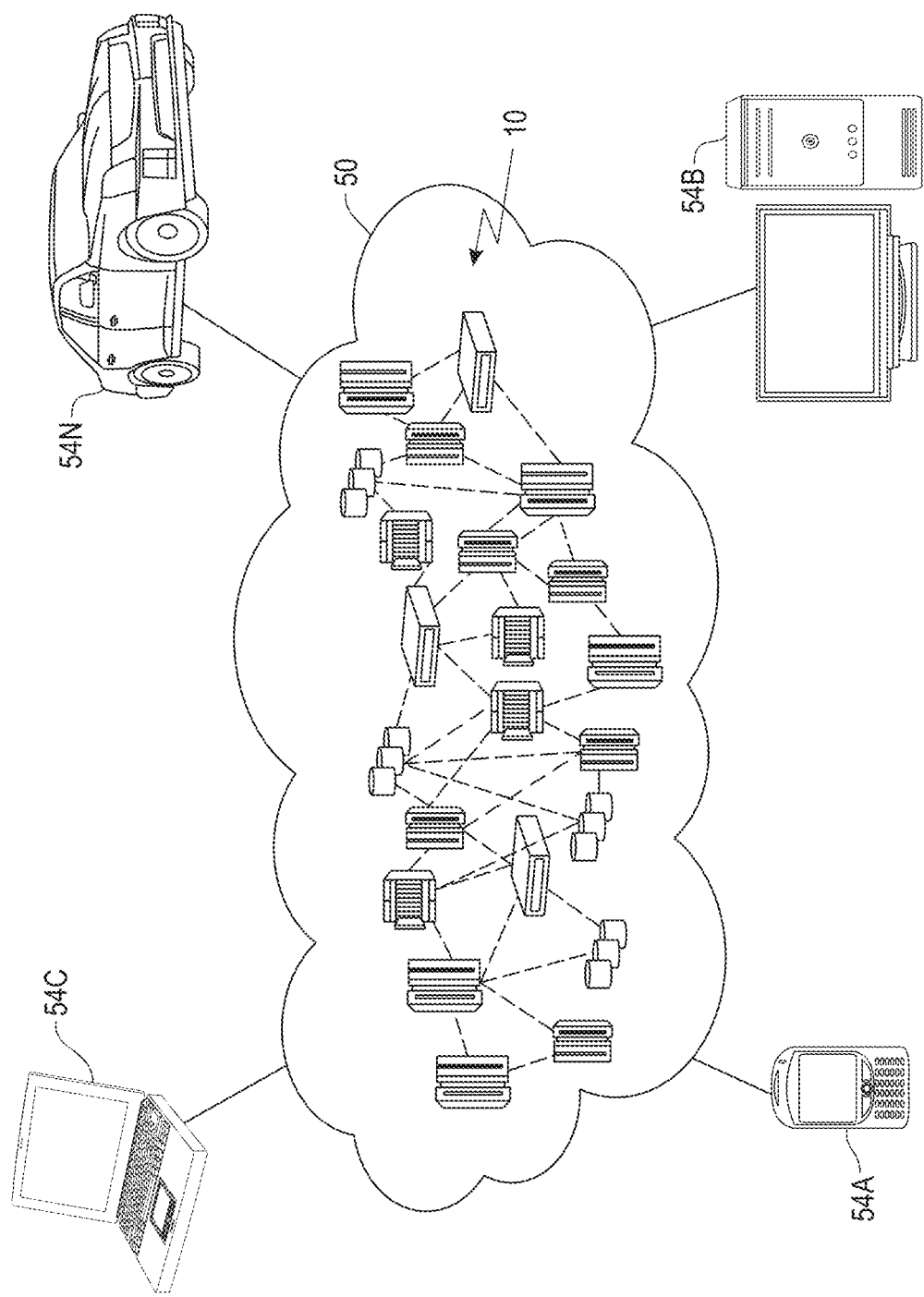
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

One or more embodiments provide for discovering knowledge rich and executable business process models from unstructured information. In one embodiment, a method is provided for discovering knowledge rich and executable business process models from unstructured information including obtaining, by a processor, unstructured data source information describing business processes. Based on the unstructured data source information, an executable specification of described business processes and a corresponding amendable textual specification are generated. Business process models are generated using a process knowledge graph based on the executable specification In one embodiment, a process knowledge graph is also generated based on related information including conditions, sequencing information, references to entities and their attributes, and application-relevant metadata. The process knowledge graph is used in turn to generate a formal specification of the business process, that corresponds to the process described in the unstructured information. The formal specification might be used for automated reasoning about and optimization of the process, or might be executable code that can be used to run enactments (i.e., instances) of the process. The formal specification might be based on conventional approaches to business process management or might be based on cognitively-enriched business process models.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
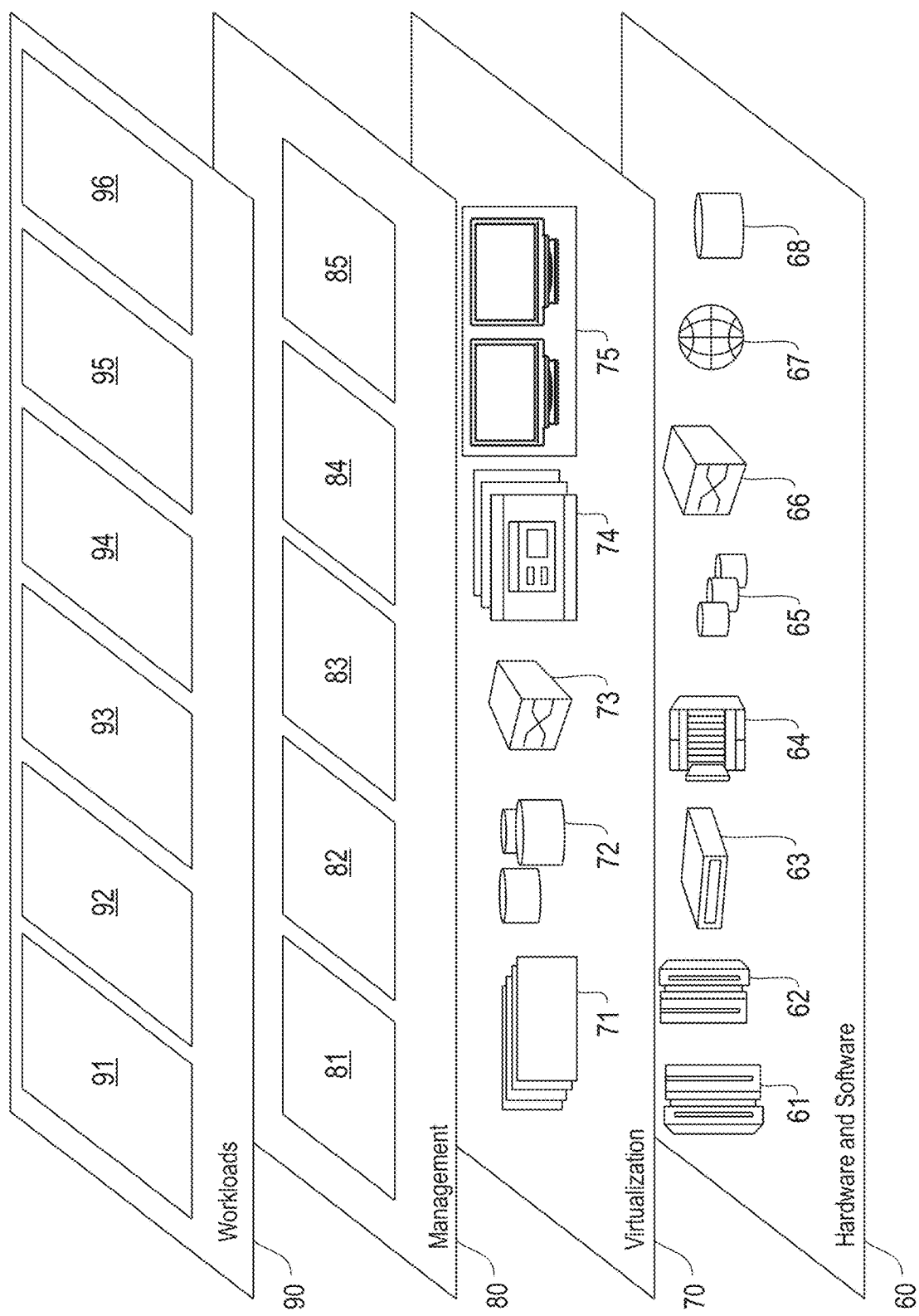
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and discovering knowledge rich and executable business process models from unstructured information processing 96. As mentioned above, all of the foregoing examples described with respect to FIG. 2 are illustrative only, and the invention is not limited to these examples.

It is understood all functions of one or more embodiments as described herein may be typically performed by the processing system 300 (FIG. 3) or the autonomous cloud environment 410 (FIG. 4), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
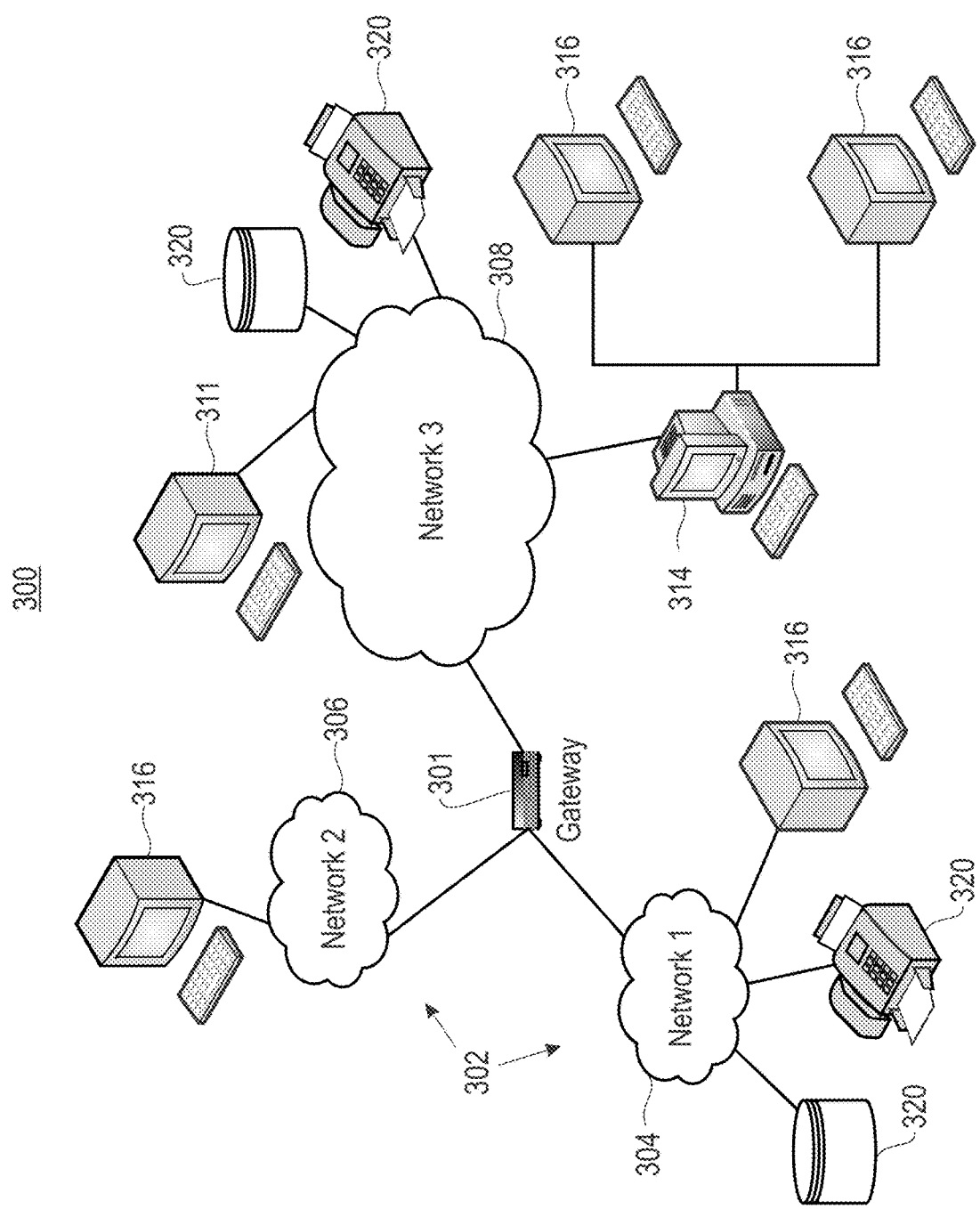
FIG. 3 is a network architecture for efficient representation, access and modification of variable length data objects, according to an embodiment.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
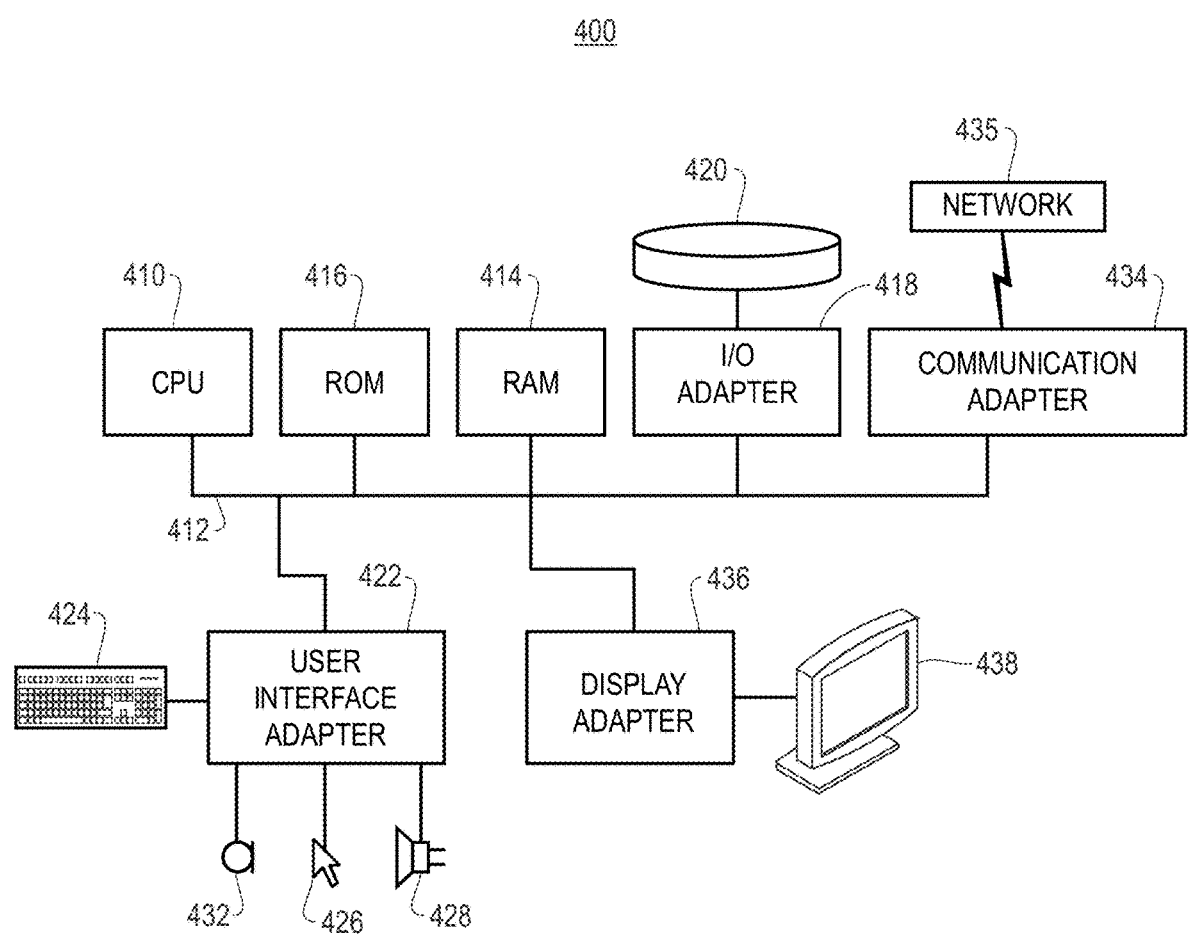
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
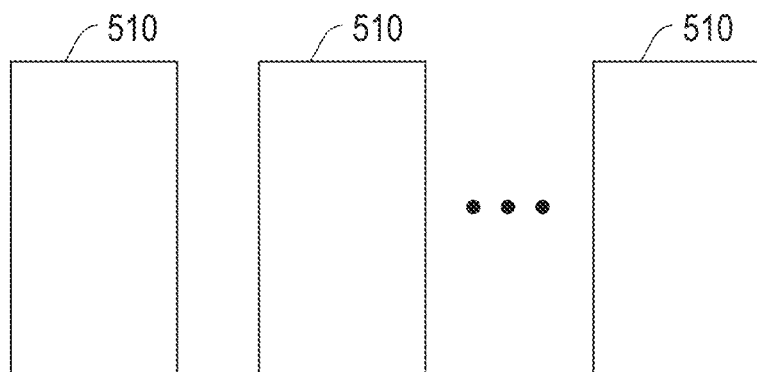
FIG. 5 is a block diagram illustrating system for discovering knowledge rich and executable business process models from unstructured information, according to one embodiment.
Figure 5:
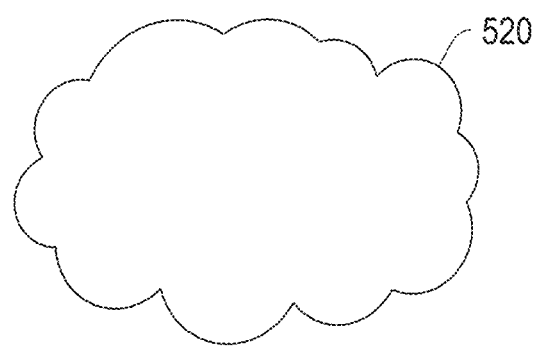
Figure 5:
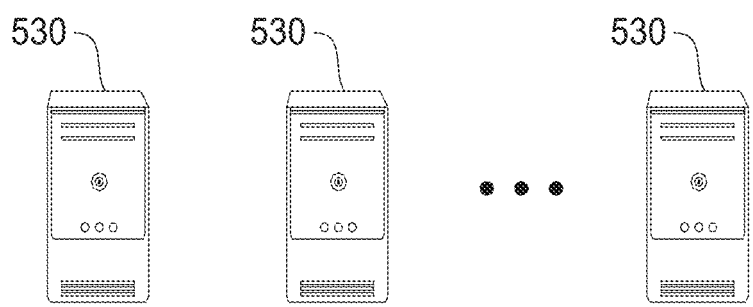

FIG. 5 is a block diagram illustrating a system 500 for discovering knowledge rich and executable business process models from unstructured information, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a datacenter, etc.), and servers 530. In one embodiment, the client devices are provided with cloud services from the servers 530 through the cloud or resource sharing environment 520.

In one embodiment, system 500 models a conventional business process, e.g., using standards such as Business Process Modeling Notation (BPMN), Case Management Model and Notation (CMMN) and/or Decision Modeling Notation (DMN). In this case the system would create executable process specifications that can be used to execute one or more enactments of the automatically generated process. In another embodiment, system 500 models the business process described in the unstructured data as a cognitively-enabled business process. This might be realized by using an enactable process knowledge graph, including relationships among the following key entities: process status knowledge; externally relevant information, including constraints where knowledge at scale is one of the fundamentally new elements that cognitive computing brings to business process management (BPM); goals/subgoals, where initial top-level goals may be specified in advance, and additional goals and sub-goals can be formulated dynamically; agents (human and machine); decisions that are made in the process, during specific process steps; actions, which are activities that are taken during the process enactment; plans where a plan is the specification of order of activities to take to achieve a specific goal/subgoal; and events that are happening in the environment, and trigger actions and decision.

Figure 6:
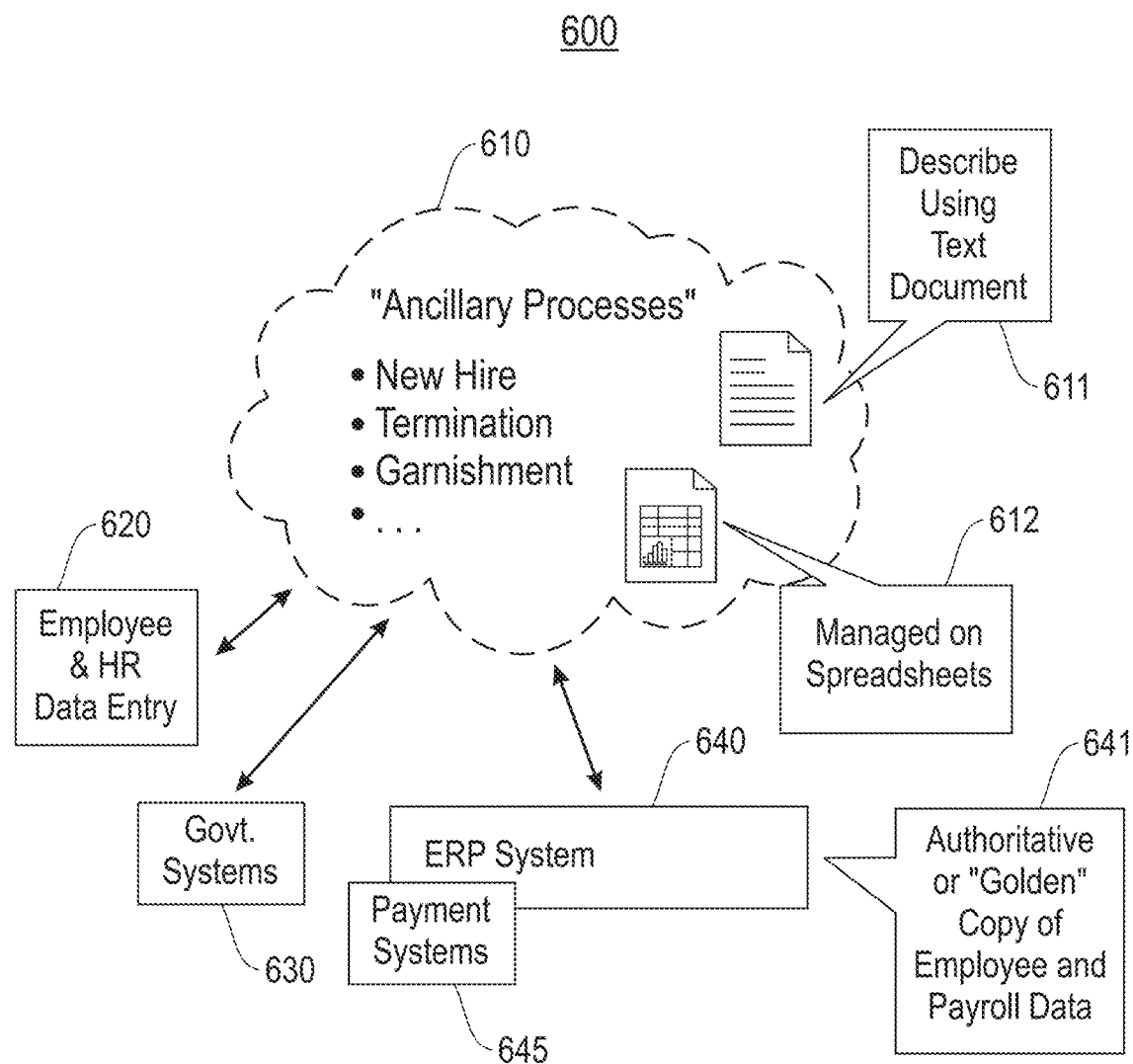
FIG. 6 illustrates an example of a processing environment in which multiple processes are performed manually, according to one embodiment.

Unstructured information in a business process hierarchy may include a first tier of decision, design and strategy processes (e.g., for: enterprise, optimization (new business model, new markets, Geo's, etc.), merger/acquisition, build versus buy, etc.); judgment-intensive processes (sales of complex information technology (IT) services, project management (e.g., complex client on-boarding, etc.), commercial insurance underwriting, etc.); transaction-intensive processes (e.g., management of back-office processing (e.g., order-to-cash reconciliation, payroll, etc.)). Some challenges of the above-identified business process hierarchy include: for decision, design and strategy processes, due to rich flexibility needed, Knowledge intensive processes are not supported systematically; a second tier may include judgment-intensive processes: the individual decisions in many "Judgement-Intensive" processes might be relatively standardized, but because there are many different decisions and possible outcomes the processes are highly variable and too expensive to automate using conventional techniques; a third tier may include transaction-intensive processes (note that FIG. 6 illustrates an example of both a transactional-intensive process and "ancillary" processes that are typically needed to create a full solution that is based on a transactional-intensive process): many "ancillary" processes are performed in ad hoc ways, spreadsheets, etc. One source of the aforementioned challenges is "dark data:" digital footprint of people, systems, apps and Internet of Things (IoT) devices. Handling and managing work (processes) involves interaction among employees, systems and devices. Interactions are occurring over email, chat, messaging apps, etc. There are descriptions of processes, procedures, policies, laws, rules, instructions, templates, schedules, regulations, applications, plans, and external entities such as customers, partners and government agencies, surrounding world, news, social networks, etc. The activities and interactions of people, systems, and IoT devices need to be coordinated. In one embodiment, generation of executable code from unstructured information is relevant to all three tiers of the hierarchy. If applied to tier three of the hierarchy then the generated process model would typically be focus on the "ancillary" processes of FIG. 6, and would be based on conventional BPM approaches. If applied to tier two of the hierarchy, then the generated process may be a conventional business process model or a cognitively-enriched business process model. If applied to tier one of the hierarchy, then the generated process model would typically be a cognitively-enriched business process model. It should be noted that the core of many back-office processing solutions use transaction-based processing, and the ancillary processes have some characteristics of "Judgement-intensive" processing of tier two of the hierarchy.

In one example embodiment, values from automatic learning of processes includes the ability to automate, optimize, and transform "long tail" processes. Automation support for business processes is the long tail (graphically of volume versus different processes (e.g., routine, high volume processes to niche, low volume processes)). Such long tail processes are common in many back-office processing situations, in application areas such as Finance and Accounting, Human Resources, and loan sourcing and processing.

FIG. 6 illustrates a back-office processing example 600 (e.g., for human resources payroll processing), according to one embodiment. In one embodiment, the back-office processing example 600 includes ancillary processes 610, which may include new hire(s), terminations(s), garnishment, etc. and include MICROSOFT® word documents 611 describing the processes, be managed with spreadsheets 612, etc. The ancillary processes 610 may be input using employee and human resources (HR) data entry 620. The example resources 600 further includes government systems 630, enterprise resource planning (ERP) system 640 with payment systems 645. One example of resources of the ERP system 640 is authoritative or "golden" copy of employee and payroll data 641.

Figure 7:
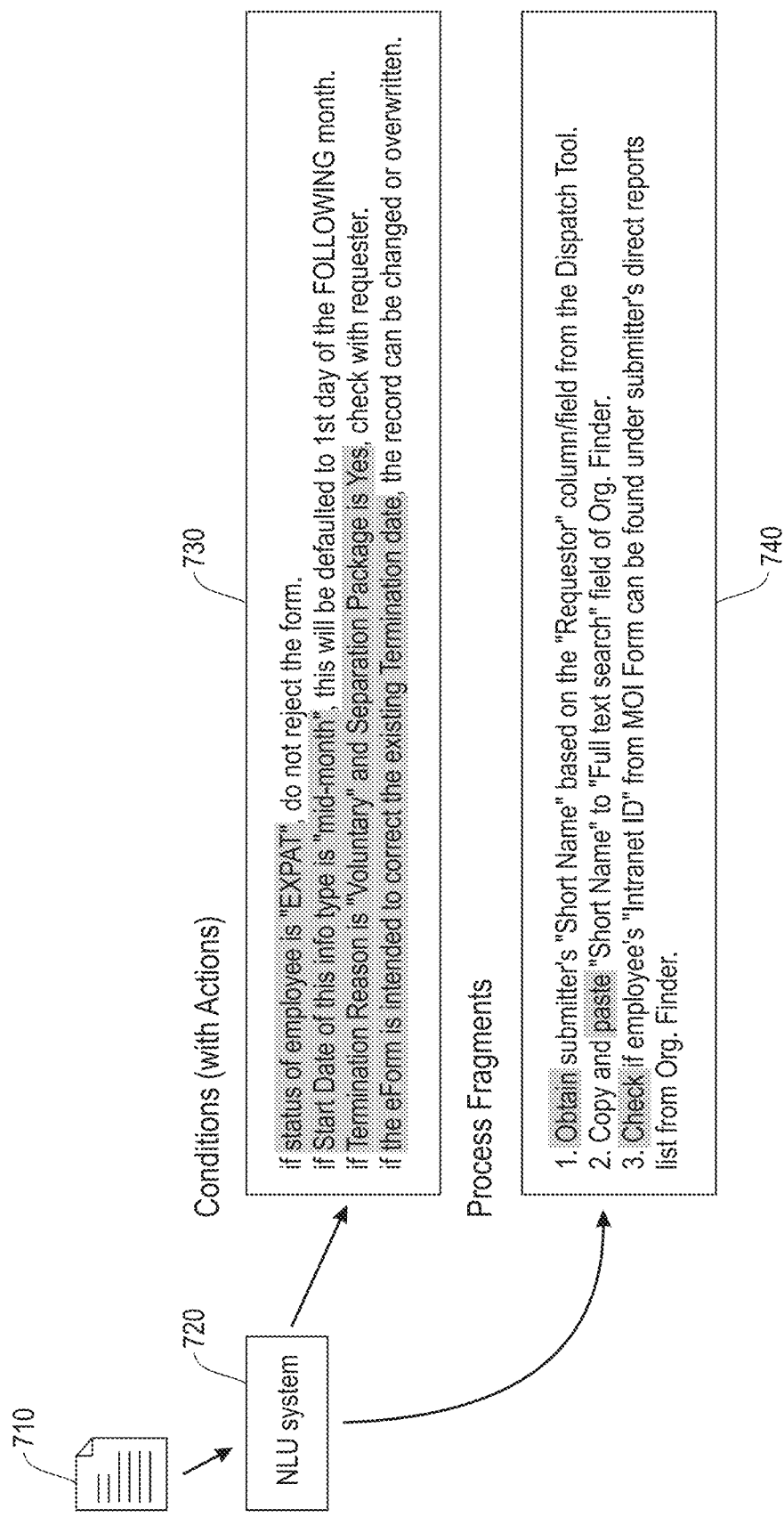
FIG. 7 illustrates extending an eAssistant to read process descriptions for preliminary results, according to one embodiment.

FIG. 7 illustrates extending a system 720 to read process descriptions for preliminary results, according to one embodiment. In one example, a document, such as a MICROSOFT® word processing document 710 is a purpose-built document about processing of terminations (across multiple countries). In one embodiment, the system 720 may include a natural language understanding (NLU) system focused on extracting process relevant information. The conditions (with actions) 730 example may include: if status of employee is "EXPAT", do not reject the form; if the start date of this info. Type is "mid-month," this will be defaulted to the first day of the following month; if the termination reason is "voluntary" and separation package is yes, check with the requester; and if the eform is intended to correct the existing termination date, the record can be changed or overwritten. In one example, the process fragments 740 may include: obtain submitter's short name based on the "Requester" column/field from the dispatch tool; copy and paste "short name" to "full text search" field of an organization finder; and check if employee's "Intranet ID" from an MOI (computer file extension) form can be found under the submitter's direct reports list from the organization finder.

Figure 8:
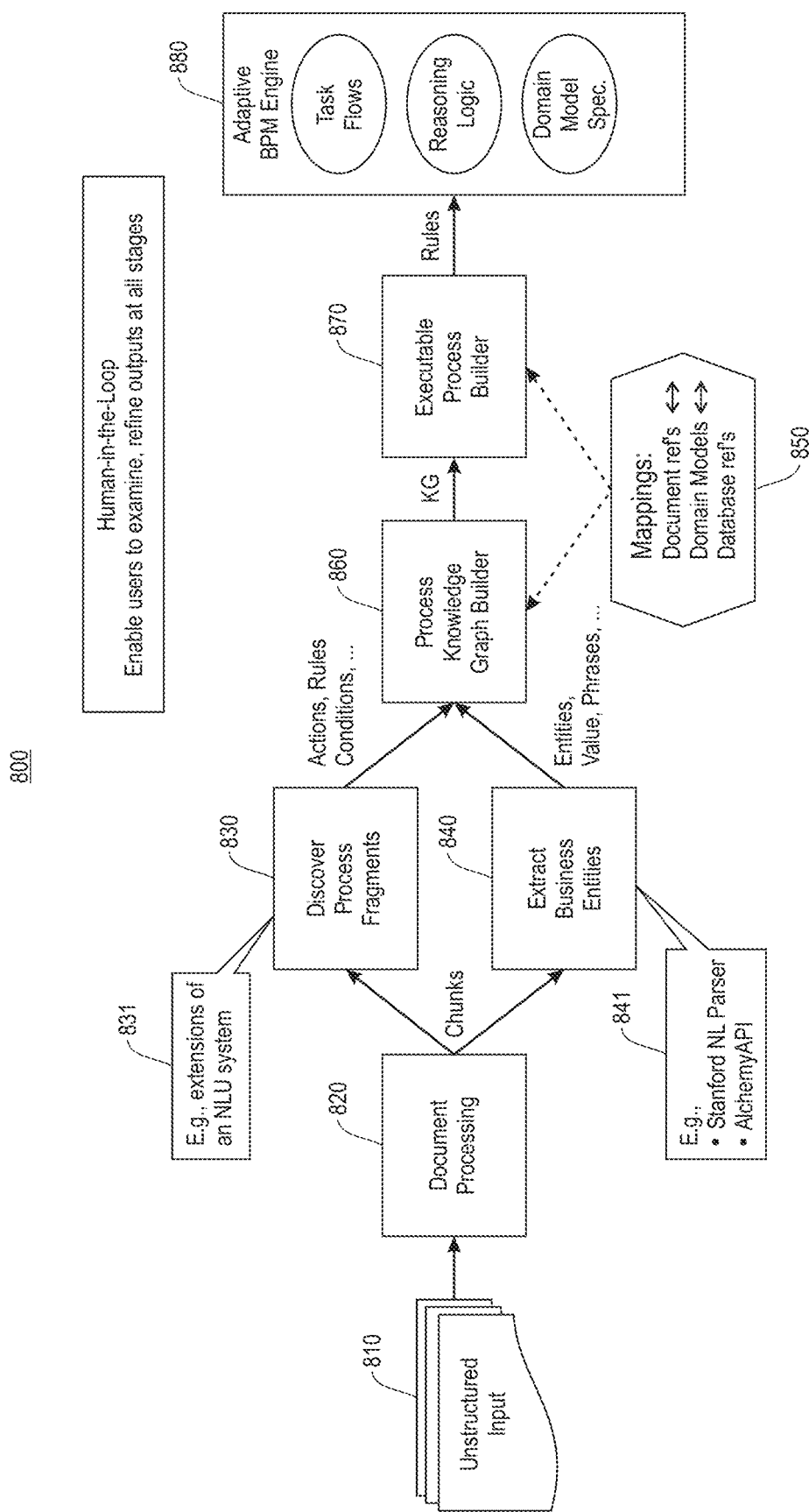
FIG. 8 illustrates an example pipeline for mapping from process descriptions to process executables, according to one embodiment.

FIG. 8 illustrates an example pipeline 800 for mapping from process descriptions to process executables, according to one embodiment. In one embodiment, the pipeline 800 includes unstructured (information) input 810, document processing 820, discover process fragments 830 processing (for example, example 831 extensions of an NLU system, e.g., system 720, FIG. 7, such as deep parsing and a repository of terms, phrases and other language constructs that indicate reference to process-relevant concepts, etc.), extract business entities 840 processing (for example, example 841 Stanford natural language parser, Alchemy API, etc.), mappings 850, process knowledge graph builder 860 and executable process builder 870. In one embodiment, the output of the executable process builder 870 includes rules that may be fed into an adaptive BPM engine 880 (which includes task flows, reasoning logic and domain model specification).

In one example embodiment, example 831 are included in the discover process fragments 830 processing. The document processing 820 results in chunks being fed into the discover process fragments 830 processing and the extract business entities 840 processing. The output of the discover process fragments 830 processing may include actions, rules, conditions, etc. The output of the extract business entities 840 processing may include entities, value phrases, etc. The output of the process knowledge graph builder 860 may include a knowledge graph. In one embodiment, a human-in-the-loop may enable users to examine and refine outputs at all stages of the pipeline 800.

In one embodiment, the document processing 820 assists in understanding macro-structure of input documents including sections/subsections, list and table layouts, meta-rules, etc. The extract business entities 840 processing extracts domain model building blocks that may include sections/subsections, list and table layouts, meta-rules, etc. The discover process fragments 830 processing extracts process constructs that may include conditions, actionable statements, sequences, scoping, etc. The mappings 850 processing includes mapping of: document references, domain models, database references, etc. The mapping 850 processing includes a mapping construction algorithm, which is self-tuning as other parts of the example pipeline 800. The process knowledge graph builder 860 constructs an all-inclusive knowledge graph including a parse-tree for process fragments. The executable process builder 870 includes human-consumable abstract representation of executable specifications, such as specifications based on templates corresponding to conditions, actions, conditional actions, etc.

In one example embodiment, a targeted domain model is created from the mappings 850 that may include, for example, employee attributes, as occurring in different data sources, different kinds of updates, etc. The adaptive BPM engine 880 may create a targeted processing model, for example, for HR processing the focus is on the individual employees, and for validating input data values, series of updates if valid, manual treatment of exceptions, etc.

In one embodiment, key process constructs to pull from a purpose-built process description, such as a User Manual, a "Desktop Procedure, or a "Job Aid" may include:

concept reference (e.g., employee, pay slip, termination, computation, country), and applications to interact with (SAP, PeopleSoft, Spreadsheets, . . . ), and temporal concepts;

actions: access data—from where, what fields, what time range; output/write data—to where, what fields, what format; obtain approval, e.g., from a Team Lead, or sometimes from a peer practitioner; and mitigate inconsistency, typically by sending an email or calling someone;

conditional action, e.g., the action should be performed for all countries (or other category) vs. for a single country;

macro level: identify the reasoning processes (access, reason, record); identify sequencing between reasoning processes; note: the focus on the reasoning processes is: kinds of "reasoning," computation steps: as for tax computation, actually, the logic here may be buried inside spreadsheet macros; validation steps: typically comparing values from corresponding fields from different data sources. Picking out the field-name-pairs is useful; "root cause" analysis steps: e.g., individual ways that a system-generated flag about potential anomalies can be explained, e.g., that an increased amount of a paycheck in one period over the previous period might be from a bonus, a raise, end of a garnishment, etc.

In one embodiment, key process constructs to pull from a purpose-built process description may include: key conceptual entities, e.g., employee, Pay Slip, Termination, Wage Type (there are several kinds), Benefits, Tax computation, Government agencies, Key documents to be created (e.g., "attestation" for verifying an employee sickness), etc.; Set of relevant countries; Set of relevant Applications, including data objects (e.g., SAP Info Types, Wage types, govt web sites), for each Info Type, set of relevant field names; key triggering events, e.g., request from Team Lead, Incoming Sickness info from client company, Reimbursement payment from a government entity, etc.

In one example embodiment, key process entities for an example HR Case may include: process fragment: Name, Triggering Condition, {Include Link to a set of Actions}; Action: verb, Role/Person, Deadline (specific date), Timeline (a time/period mention), Data/Attribute/Business Entity; Goal/Objective: description of what is desired to be achieved, e.g. termination of an employee; Conditions/Rules: Examples: "if . . . then else," " . . . . Unless . . . "; Conditions/Rules have anticendent and consequent sections; the anticendent part is a logical statement; the consequent constrains one or more Actions; Action Flow: assigning a sequence number to each action in the process fragment.

Figure 9:
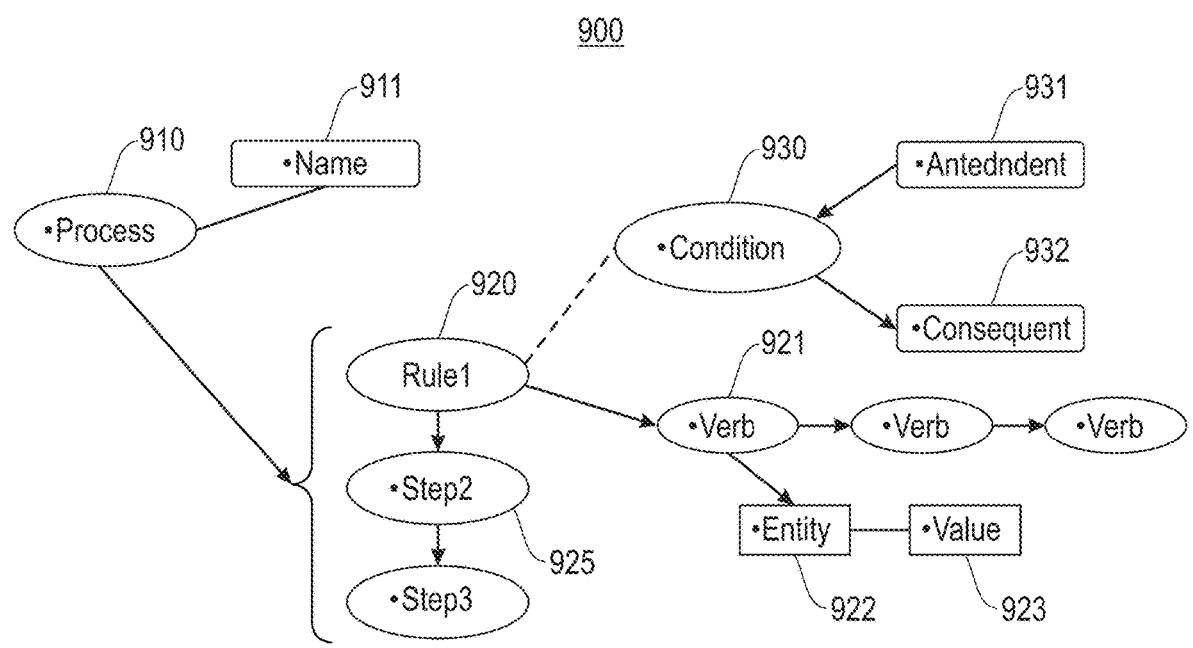
FIG. 9 illustrates a portion of an example process knowledge graph model, according to one embodiment.

FIG. 9 illustrates an example process knowledge graph 900 model, according to one embodiment. In one embodiment, a process 910 has a name 911 and an "action flow" that defines the order precedence of actions/rules 920 in a process fragment. A process fragment can be hierarchical (may have one or more "process fragments"). A fragment may have information on execution order/precedence of its sub-process fragments. A fragment has one or more actions, and conditions/rules 920. All attributes of an action (such as deadline/timeline, person/role, data/entity) are linked to the action with appropriate links. The rules 920 may include steps 925. A condition 930 may have antecedent 931 and consequent 932. Verbs 921 may have entity 922 and value 923.

Returning to FIG. 8, in one embodiment, process knowledge graph builder 860 includes the following extraction guidelines and notes, according to one embodiment. While processing a document, a first question is identification of process fragment boundary (where a process fragment starts, and when it ends). Detection of a block of actions in a list, in a paragraph, or section signals identification of candidate process fragment. The process names may be deduced from section headers, or any heading of the text of paragraph that contain the process fragment. In one embodiment, joining actionable statement with entity information is processed using the following. When joining the system 720 (FIG. 7) actionable statement information with entities from AlchemyAPI, use the sentence boundary to identify whether an entity is in the theme of the action (ActionAPI also may be used for this purpose). The focus of AlchemyAPI is on extracting references to entities and attributes of entities, which is deep parsing. In identification of the entity and action relationship, the syntactic role of the entity is used (whether object, in subject, etc.).

In one embodiment, the pipeline 800 may produce, as executable code, a specification of a hybrid rule-process model. An insurance process is dominated by traversing parts of a large, very wide, virtual decision tree (or directed acyclic graph (DAG)). The hybrid rule-process models may be driven by a large set of rules, that may evolve over time.

Traditional separation of "process model" and "process instance" is not a good fit. In one embodiment, the pipeline 800 may generate an executable specification that is based on a cognitively-enriched business process model. Key requirements on a "new" modeling approach may include: repeatability/consistency (until rules are modified), points of uniformity to enable reporting, both operational efficiency and business-level rationale and optimizations, and traceability/provenance for each case in a standardized way to keep all relevant data and rules applied.

In one embodiment, mapping from process descriptions to executables may include, for example: for document processing 820, insurance manuals focus on types of companies and have long lists of if-then-else rules, exclusions, etc. Discover business fragments 830 processing processes constructs mainly around rules that define a decision tree. The extract business entities 840 processing extracts domain model building blocks. The process knowledge graph builder 860 processing generates a knowledge graph that includes meta-rules, e.g., regarding treatment of exclusions. The mappings 850 processing may include look-up tables used by authors of manuals in a mapping construction algorithm/process. The executable process builder 870 includes human-consumable abstract representation of executables.

Figure 10:
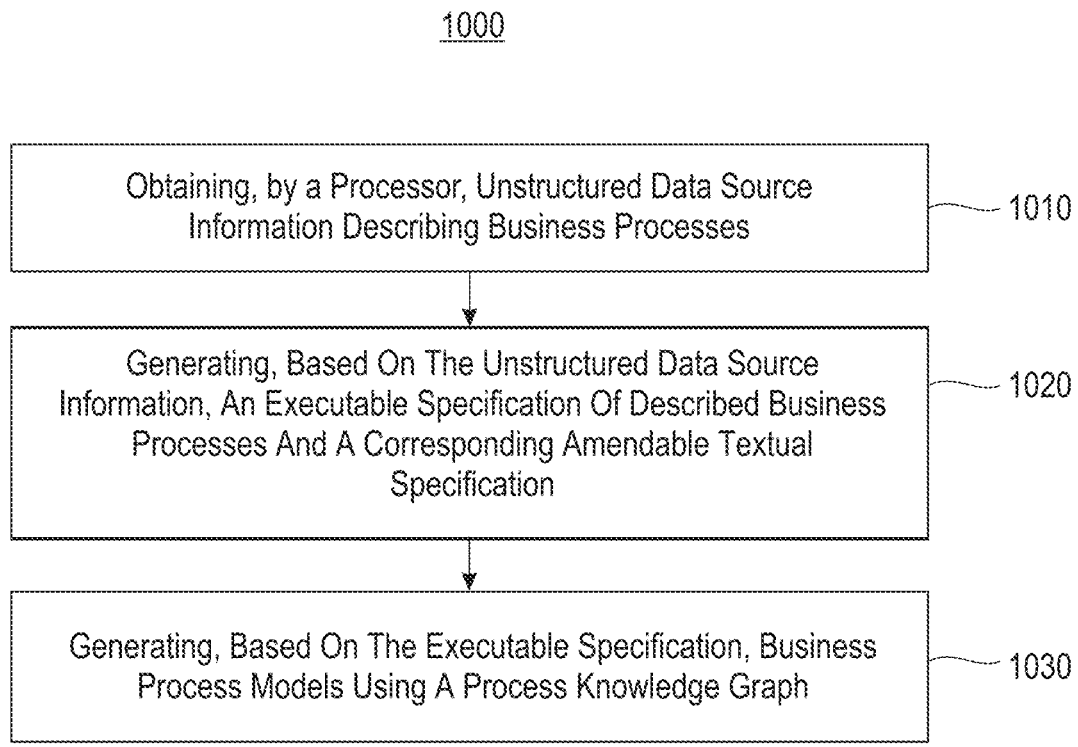
FIG. 10 illustrates a block diagram for a process for discovering knowledge rich and executable business process models from unstructured information, according to one embodiment.

FIG. 10 illustrates a block diagram for a process 1000 for discovering knowledge rich and executable business process models from unstructured information, according to one embodiment. In block 1010, process 1000 obtains or ingests, by a processor (e.g., a processor in cloud computing environment 50, FIG. 1, system 300, FIG. 3, system 400, FIG. 4, or system 500, FIG. 5), unstructured data source information describing business processes. In block 1020, process 1000 generates, based on the unstructured data source information, an executable specification of described business processes and a corresponding amendable textual specification. In block 1030, process 1000 generates, based on the executable specification, business process models using a process knowledge graph.

In one embodiment, process 1000 may further generate a process-ware text representation model based on the unstructured data source information. Process 1000 may further extract actionable statements and business constraints from text from the process-ware text representation model. In one embodiment, process 1000 extracts, for each actionable statement, business entities and metadata related to the actionable statements. Process 1000 may further discover process fragments by determining process boundaries, and a set of actionable statements and business constraints. Process 1000 may additionally generate the process knowledge graph based on the process fragments and the set of actionable statements and business constraints.

In one embodiment, in process 1000 the unstructured data source information includes at least one of: electronic device and sensor information, text from: process manuals, schedules, plans, policies, rules, software applications and electronic communications. The business constraints include at least one of actions, rules and conditions. The business process models comprise one of business process management (BPM) models and cognitively-enriched business process models. In one embodiment, for process 1000, process boundaries are indicated by sub-process names or numbered elements in a list.

In one embodiment, process 1000 may further include mapping the discovered process knowledge graph into an executable process specification. The process fragments are hierarchical, and a process fragment includes information on at least one of: execution order and precedence of sub-process fragments.

In one embodiment, in process 1000 a process fragment further includes at least one of: an action, a condition and a rule, and a process includes an action flow that defines order precedence of actions or rules in a process fragment. In one embodiment, one or more references to an entity or entity attribute are linked to the action with at least one link.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for discovering knowledge rich and executable business process models from unstructured information, comprising:
    obtaining, by a processor, unstructured data source information describing business processes;
    discovering, by the processor, based on the unstructured data source information, process fragments by determining process boundaries, and a set of actionable statements and business constraints;
    generating, by the processor, a process knowledge graph based on the process fragments and the set of actionable statements and business constraints;
    generating, by the processor, based on the process knowledge graph, an executable process specification of described business processes and a corresponding amendable textual specification; and
    generating, by the processor, based on the executable process specification, executable business process models.

2. The method of claim 1, further comprising:
    generating a text representation model based on the unstructured data source information;
    extracting the set of actionable statements and business constraints from text from the text representation model; and
    for each actionable statement, extracting business entities and metadata related to the actionable statements.

3. The method of claim 1, wherein:
    the unstructured data source information comprises at least one of: electronic device and sensor information, text from: process manuals, schedules, plans, policies, rules, software applications and electronic communications;
    the business constraints comprise at least one of actions, rules and conditions; and
    the executable business process models comprise one of business process management (BPM) models and cognitively-enriched business process models.

4. The method of claim 1, wherein the process boundaries comprise sub-process names or numbered elements in a list.

5. The method of claim 1, further comprising:
    mapping information from the process knowledge graph to generate the executable process specification.

6. The method of claim 1, wherein the process fragments are hierarchical, and a process fragment comprises information on at least one of execution order and precedence of sub-process fragments.

7. The method of claim 6, wherein a process fragment further comprises at least one of an action, a condition and a rule, and a process comprises an action flow that defines order precedence of actions or rules in a process fragment.

8. The method of claim 7, wherein one or more references to an entity or entity attribute are linked to the action with at least one link.

9. A computer program product for discovering knowledge rich and executable business process models from unstructured information, the computer program product comprising a computer readable storage medium having program instructions embodied therewith, the program instructions executable by a processor to cause the processor to:
   obtain, by the processor, unstructured data source information describing business processes;
   discover, by the processor, based on the unstructured data source information, process fragments by determining process boundaries, and a set of actionable statements and business constraints;
   generate, by the processor, a process knowledge graph based on the process fragments and the set of actionable statements and business constraints;
   generate, by the processor, based on the process knowledge graph, an executable process specification of described business processes and a corresponding amendable textual specification; and
   generate, by the processor, based on the executable process specification, executable business process models.

10. The computer program product of claim 9, further comprising program instructions executable by the processor to cause the processor to:
    generate, by the processor, a text representation model based on the unstructured data source information;
    extract, by the processor, the set of actionable statements and business constraints from text from the text representation model; and
    for each actionable statement, extract, by the processor, business entities and metadata related to the actionable statements.

11. The computer program product of claim 9, wherein:
    the business constraints comprise at least one of actions, rules and conditions;
    the unstructured data source information comprises at least one of: electronic device and sensor information, text from: process manuals, schedules, plans, policies, rules, software applications and electronic communications; and
    the executable business process models comprise one of business process management (BPM) models and cognitively-enriched business process models.

12. The computer program product of claim 9, wherein the process boundaries comprise sub-process names or numbered elements in a list.

13. The computer program product of claim 9, further comprising:
    mapping information from the process knowledge graph to generate the executable process specification.

14. The computer program product of claim 9, wherein:
    the process fragments are hierarchical, and a process fragment comprises information on at least one of execution order and precedence of sub-process fragments.

15. The computer program product of claim 14, wherein a process fragment further comprises at least one of an action, a condition and a rule, a process comprises an action flow that defines order precedence of actions or rules in a process fragment, and one or more references to an entity or entity attribute are linked to the action with at least one link.

16. An apparatus comprising:
    a memory configured to store instructions; and
    a processor configured to execute the instructions to:
       obtain unstructured data source information describing business processes;
       discover, based on the unstructured data source information, process fragments by determining process boundaries, and a set of actionable statements and business constraints;
       generate a process knowledge graph based on the process fragments and the set of actionable statements and business constraints;
       generate, based on the process knowledge graph, an executable process specification of described business processes and a corresponding amendable textual specification; and
       generate, based on the executable process specification, executable business process models.

17. The apparatus of claim 16, wherein the processor is further configured to execute the instructions to:
    generate a text representation model based on the unstructured data source information;
    extract the set of actionable statements and business constraints from text from the text representation model; and
    for each actionable statement, extract business entities and metadata related to the actionable statements.

18. The apparatus of claim 16, wherein the processor is further configured to execute the instructions to:
    map information from the process knowledge graph into the executable process specification.

19. The apparatus of claim 16, wherein:
    the unstructured data source information comprises at least one of: electronic device and sensor information, text from: process manuals, schedules, plans, policies, rules, software applications and electronic communications;
    the business constraints comprise at least one of actions, rules and conditions;
    the process boundaries comprise sub-process names or numbered elements in a list; and
    the process fragments are hierarchical, and a process fragment comprises information on at least one of execution order and precedence of sub-process fragments.

20. The apparatus of claim 19, wherein a process fragment further comprises at least one of an action, a condition and a rule, a process comprises an action flow that defines order precedence of actions or rules in a process fragment, and one or more references to an entity attribute are linked to the action with at least one link.

* * * * *